May 26, 1953  G. KEINATH  2,639,964
MULTIPLE DIAGRAM-FRAME RECORDER
Filed Oct. 10, 1949  4 Sheets-Sheet 2

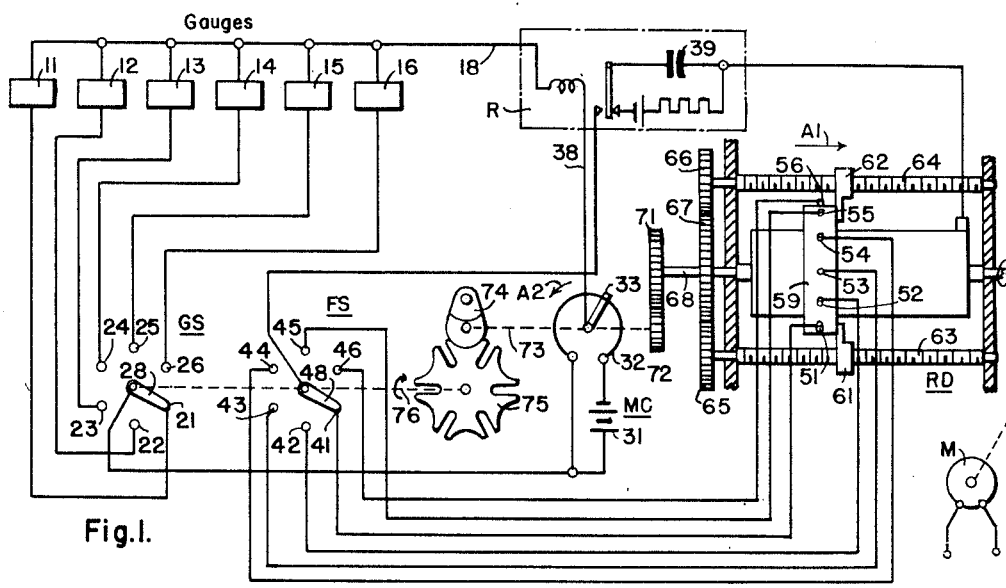

*INVENTOR.*
George Keinath.
BY
C. M. Avey
ATTORNEY

May 26, 1953  G. KEINATH  2,639,964
MULTIPLE DIAGRAM-FRAME RECORDER
Filed Oct. 10, 1949  4 Sheets-Sheet 3

INVENTOR.
George Keinath.
BY
C. M. Avery
ATTORNEY

May 26, 1953 — G. KEINATH — 2,639,964

MULTIPLE DIAGRAM-FRAME RECORDER

Filed Oct. 10, 1949 — 4 Sheets–Sheet 4

*INVENTOR.*
George Keinath.
BY
*ATTORNEY*

Patented May 26, 1953

2,639,964

UNITED STATES PATENT OFFICE 2,639,964

MULTIPLE DIAGRAM-FRAME RECORDER

George Keinath, Larchmont, N. Y.

Application October 10, 1949, Serial No. 120,465

14 Claims. (Cl. 346—33)

My invention relates to multiple diagram-frame recorders and, in some of its aspects, particularly to diagram recorders of the scanning type as known, for instance, from my U. S. Patent 2,387,760.

It is an object of my invention to provide scanning-type diagram recorders which produce many diagram records on a common chart of smaller area than heretofore necessary, or which, for a given chart size, accommodate more and larger individual diagrams on the chart than the known recording apparatus.

Another object of my invention is to devise recording apparatus capable of producing on a common chart a plurality of diagram records which are taken during selected different periods and recorded on a common time base to permit a direct comparison. For example, when a physical magnitude such as a kilowatt value is measured and recorded every day, the just-mentioned object of the invention aims at obviating the daily renewal of the record chart and placing all seven diagrams of the week on the same chart and on a common time base so that differences in the daily loads are readily apparent.

In the known scanning-type recorders for producing a plurality of diagrams on a cyclically revolving endless chart, the individual diagram frames are spaced from each other an appreciable distance corresponding to the amount of chart revolution that occurs during the dead interval in which a stepping switch must operate to disconnect the recorder circuit from one condition-responsive gauge or pickup to the next pickup. It is, therefore, also an object of my invention to devise multiple scanning-type recorders in such a manner that the occurrence of wasteful spacing between adjacent diagram frames due to the just-mentioned switching interval is reduced to any desired extent or is completely eliminated.

It is also an object of my invention to provide multiple diagram recording apparatus especially suitable for accommodating on a common chart a very large number of individual diagram records, for instance more than 100, and to reduce the recording time beyond that needed for conventional recorders of comparable operative capacity.

According to a feature of my invention and referring to scanning-type recording devices for accommodating a given number ($n$) of sequential diagram frames on a common chart, I drive the cyclically operating potentiometric member, appertaining to a device of this type, in such a speed relation to the recorder drive that the cycle period of potentiometric variation is a given amount or percentage larger than the period in which the relative recorder movement proceeds $1/n$ of the chart dimension in the sequence direction of the diagram frames. While this feature of my invention is applicable to strip chart recorders in which a chart passes only once by the marking or stylus element, the invention is especially well suited for recorders with an "endless chart" which passes cyclically and repeatedly by the marking member, such as a chart mounted on the peripheral surface of a cylinder or a belt-like chart coupled with a driving cylinder and having a larger peripheral length than the cylinder so that several cylinder revolutions are required for a single cycle of chart revolution. In an endless-chart recorder having the diagram frames in a peripheral sequence, two or more full chart revolutions are required, according to the invention, for recording a single sequence of recording marks in the respective diagram frames. As a result, the diagrams are recorded with any desired degree of mutual spacing or overlapping so that a chart of given size can accommodate more or larger diagram frames than otherwise possible.

According to another feature of the invention, I provide a multiple scanning-type recorder with a plurality of rigidly interconnected and mutually insulated styli which are separately controlled during the cyclical movement of the recorder chart. In this manner, the operative capacity of the device is increased and the time needed for recording a multitude of measuring values can be greatly reduced. If, according to a more specific feature, the relative travel between stylus and chart in the diagram sequence direction is made larger than the spacing between the styli, overlapped diagram frames will result, thus securing also the advantage of the first-mentioned feature.

According to a further feature of the invention, I equip multiple diagram recorders with selector switch means which have a first movable contact member driven from the chart or stylus drive of the recorder and a second movable contact member which is selectively adjustable independent of the first member, both members being electrically connected with the stylus control means so that a diagram is recorded in only one frame selected by the adjustment of the second contact member.

The foregoing and other objects, features, and advantages of the invention will be apparent from the following description in conjunction with the embodiment of the invention exemplified by the drawings, in which:

Figure 1 shows a circuit diagram and schematic apparatus design of a multiple stylus recorder for producing overlapped curve diagrams on an endless chart, while Fig. 2 is a schematic side view of the recorder drum and multiple stylus assembly, and Fig. 3 an example of an appertaining chart cut open and laid flat;

Fig. 4 shows diagrammatically a single-stylus recorder for producing overlapped curve diagrams on an endless belt-type chart, such a chart being shown developed in Fig. 5;

Figure 6:
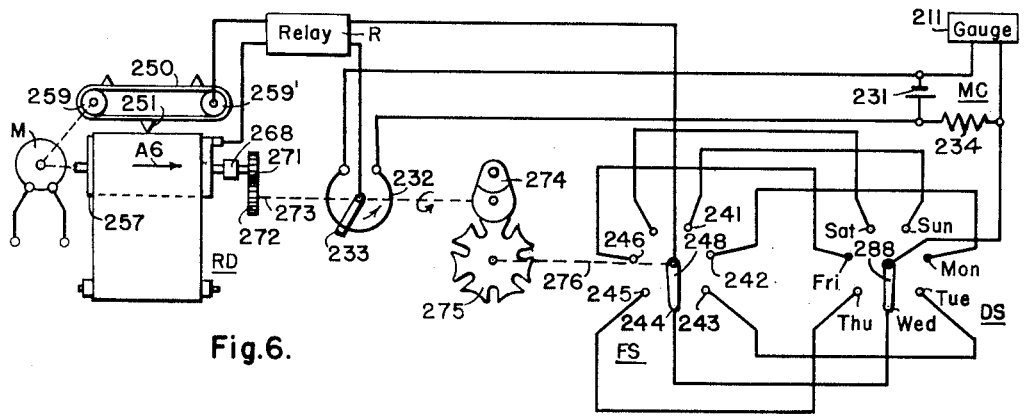
Fig. 6 illustrates the circuit and essential design diagram of a multiple time base recorder for an endless chart such as shown developed in Fig. 7.

For facilitating a comparison between the different embodiments and simplifying the description of details common to these embodiments, the same reference numerals are used in all figures for respective functionally similar elements, except that the reference numerals for the embodiment of Figs. 1 to 3 have two digits while those for the other embodiments have respectively different third digits prefixed. For instance, item 11 in Fig. 1 is comparable with items 111 in Fig. 4, 211 in Fig. 6, 311 in Fig. 8, 411 in Fig. 9, 511 in Fig. 11, and 611 in Fig. 13.

The system illustrated in Figs. 1 to 3 has six gauges 11 to 16 and records the respective values in six diagram frames of a single recording chart. The gauges are assumed to be of the voltage generating type and may consist of thermocouples responsive to temperature at six different measuring points. All gauges have a common lead 18. The respective other leads of the gauges are individually connected to bank contacts 21 to 26 of a selector switch GS (gauge selector). The movable contact 28 of the gauge selector GS is connected to a potentiometric measuring circuit MC which comprises a suitable source 31 of constant reference voltage and a cyclically operating potentiometric device. This device is exemplified by a rheostat 32 which is connected across the source 31 and has a movable contact 33 connected to one input terminal of a relay R whose other input terminal is attached to the common gauge lead 18.

The relay R responds to the occurrence of a predetermined condition of the measuring circuit MC, for instance, the occurrence of a given relay threshold voltage or the occurrence of circuit balance. Assuming that the relay R is balance responsive (null relay), it will respond when the potentiometer contact 33 during its cycle of movement passes through the point at which the voltage then supplied from the gauge then in operation is just balanced by the opposing voltage drop imposed by the source 31 across the tapped off portion of the rheostat 32. At that moment, the relay performs a control action, for instance, it releases a discharge from a previously charged capacitor 39. The relay may be of the electromagnetic, electrodynamic or electronic type, and its circuit may include an amplifier, if needed. The particular type of relay, relay circuits and relay response are not essential to the present invention, and since the just-mentioned various types of relays are well known as such, they are not further described in this specification.

The output circuit of the relay R is connected to a recording device RD through a selector switch FS (frame selector) with six bank contacts 41 to 46 and a movable contact 48.

The recording device RD is equipped with six styli 51 and 56 which cooperate with a drum 57. The recording chart is endless and directly mounted on the drum surface. The styli are mounted on a rigid carrier 59 in a common plane and are angularly spaced 30° from one another about the drum axis. The styli are insulated from one another and are connected to the respective bank contacts 41 to 46 of the frame selector FS. The drum 57 consists of metal and is electrically connected in the output circuit of relay R. When the relay R responds to the occurrence of balance in the potentiometric measuring circuit MC, it passes a current impulse through its output circuit. The voltage, then appearing across the drum 57 and the one stylus then connected through the frame selector contact 48 to the relay, causes a dot to be marked on the chart. For this purpose the chart consists of a suitable electroresponsive paper.

It should be noted that the particular operation and design of the mark producing means are not essential to the present invention. Electrode-type stylus-and-drum means are shown in Fig. 1 (as well as in the illustrations of the other embodiments) only because this type of device lends itself readily to a simple and lucid representation within a single plane of illustration. However, a mark producing device of different type may be used instead, in particular an electromagnetically actuated stylus (pen or pencil) which is forced against the chart paper only when the relay supplies an energizing impulse. Such other marking devices are well known and hence do not require further description or illustration.

According to Figs. 1 and 2, the stylus carrier 59 has two lugs 61 and 62 threaded on respective feed screws 63 and 64. The feed screws carry respective gears 65 and 66 in meshing engagement with a common drive gear 67 mounted on the shaft 68 of the recorder drum 57. Shaft 68 is driven at constant speed from a suitable drive represented by a motor M. During the continuous revolution of drum 57, the stylus assembly travels along the drum 57 in the direction of the arrow A1. The drum shaft 68 is coupled by transmission gears 71 and 72 to the shaft 73 of the potentiometer contact 33. The transmission ratio of gears 71 and 72 is 1:3. Consequently, the potentiometer contact 33 performs three complete cycles of revolution for each revolution of the chart. Shaft 73 drives another transmission shown as a Geneva gear. The driver 74 of the Geneva gear is mounted on the shaft 73, and the driven member 75 operates a shaft 76 common to the movable selector contacts 28 and 48 of switches GS and FS. It will be recognized that the switches GS and FS may consist of a single stepping switch with two banks of contacts. The angular position of the Geneva driver 74 relative to the potentiometer contact 33 is such that the contacts 27 and 48 are switched one step during the interval in which the potentiometer contact 33 passes through its dead angle between the terminals of the rheostat 32. Consequently, after each complete potentiometric cycle a different gauge is switched into the measuring circuit, and during the successive potentiometric cycles respective dot marks are recorded on the chart for sequentially different measuring points.

Assume, for instance, that the elements of the system are in the illustrated respective positions and that the rheostat contact 33 is rotating in the direction of the arrow A2. Then, only the gauge 11 is connected in the measuring circuit MC. At the start of the potentiometric cycle then in progress, the stylus 51 was at the chart point P1 indicated in Fig. 3. During the potentiometric cycle, the relative scanning movement between stylus 51 and chart 60 extends downwardly along the line L. When the potentiometer contact 33 reaches the end point of its cycle (disregarding the spacing due to the dead interval), the stylus 51 will be at point P3 (Fig. 3) relative to the chart. Somewhere between points P1 and P3 will the potentiometer contact pass through the balance point. At that moment, relay R issues a marking impulse to the recording device RD so that the stylus produces a dot on the chart. This dot is exemplified by point Px in Fig. 3. After the stylus 51 has thus travelled across the area of the diagram frame F1, the Geneva gear moves the selector contacts one step. Now the gauge 12 is connected in the measuring circuit while the relay output circuit is connected with stylus 52. Since stylus 52 is 30° displaced relative to stylus 51, the next scanning movement, coincident with the starting point of the potentiometric cycle, is located at point P2 (Fig. 3). Stylus 52 now travels from point P2 to point P4 across diagram frame F2. Somewhere along this travel, relay R responds to balance and energizes the recording device to produce another mark Py on the chart within the frame F2. After the stylus reaches point P4, the Geneva gear advances the selector contacts another step so that now the stylus 53 travels relative to chart 60 from point P3 to point P5 across the diagram frame F3, and so forth. In this manner all six diagram frames F1 to F6 are sequentially scanned during two complete revolutions of the chart 60. Thereafter, and while the stylus assembly is slowly progressing in the direction of arrow A1, the peripheral scanning cycle is repeated until the whole area of the chart is covered. In this manner six individual curve diagrams C1 to C6 are produced on the chart, each composed of a multitude of individual dot recordings.

With the transmission ratios chosen as exemplified above, the six diagram frames F1 to F6 are 50% overlapped and hence cover together a chart area otherwise occupied by only three diagrams of the same individual size. This overlapping is due to the fact that for producing six or any other desired number ($n$) of diagrams on the scanning type recorder, the appertaining cyclically operating potentiometric device has a cycle period which is a given amount or percentage longer than the period within which the scanning movement of the recorder along the sequence direction (arrow A3 in Fig. 3) of the diagram frames covers ⅙, or generally $1/n$, of the chart area. In the above-described embodiment, the potentiometric cycle period is twice as long as the period in which the relative travel between stylus and chart covers ⅙ of the chart dimension in the diagram sequence direction. It is apparent that any desired degree of overlapping is obtained by a corresponding choice of the transmission ratios. For instance, a diagram overlap of ¼, ⅔, ¾ and more may be useful depending upon the character of the expected curves.

When the magnitudes to be recorded are temperatures within a range from 0° to 100° C. and have a normal value around 70° C. with normal fluctuations between 60° and 70° C., only occasionally dipping to values below 50° C., then an overlapping of 50% is favorable so that all temperatures between 50° and 100° C. are recorded in separate half frames. Overlapping diagram frames are advantageous not only for fairly constant values but also when all diagrams follow a similar pattern. This is the case, for instance, in X—Y recorders for recording strain versus stress where all curves start in one diagram corner near the zero line and progress at different angles toward the horizontal. In such cases an overlapping of as much as 80% to 90% of the full scale can be chosen without causing confused records. The overlapping feature is also applicable with two or more diagrams within the same frame, and the different curves of each frame may then be distinguished by different intensities or colors of the marks or by a distinctive line pattern such as .......... or ---------- or .—.—.—.—., etc. as is well known for records of the chopper bar type.

While, as will be shown in a later place, the invention permits various modifications in the design and electric connections of multiple stylus recorders, it will first be shown that the just-mentioned overlapped-frame feature in scanning-type recorders can also be realized with a number of styli smaller than the number of gauges or diagram frames, in particular with only one stylus for any desired number of gauges or frames. An embodiment of this type is illustrated in Figs. 4 and 5.

The system shown in Fig. 4 records the quantities responded to by six gauges 111 to 116. These gauges are assumed to be of the variable impedance type. They may consist of resistive strain gauges or variable inductance devices. The appertaining measuring circuit MC is a Wheatstone bridge energized from a suitable voltage source 131 and equipped with a reference impedance 134. A potentiometric rheostat with a resistor 132 and a movable contact 133 serves to vary the circuit condition from maximum unbalance in one direction through balance to maximum unbalance in the other direction. Only one gauge is connected in the bridge circuit at a time by means of a selector switch GS (gauge selector). This switch has seven bank contacts 141 to 147, six of which are connected to the respective gauges while the seventh contact 147 is vacant. The output terminals of the bridge circuit MC are connected through an amplifier A to an impulse transmitting relay R, for instance, of the electronic type. The output circuit of the relay R is connected to the recording device RD proper. This device has a drum 157 operated from a drive motor M, and a single stylus 150 mounted on a stylus carrier 159. During the revolution of drum 157, the stylus carrier 159 travels along a feed screw 163. The recording device is equipped with an endless strip chart 160 of such peripheral length that several revolutions of drum 157 are necessary for each full revolution of the chart 160. Like in the embodiment of Figs. 1 to 3, the stylus 150 and the chart 160 of the embodiment of Fig. 4 perform a scanning movement relative to each other in two coordinate directions, i. e. a fast and repetitive movement in the sequence direction of the diagram frames and a slow progressive movement across the chart, the latter being either a function of time or a function of a variable quantity, i. e., load or temperature.

The drum shaft 168 has a gear 171 in meshing engagement with a gear 172 on the shaft 173 of the potentiometer slider 133. Shaft 173 carries the driver 174 for a Geneva gear member 175 which is mounted on the shaft 176 of the selector switch GS. The Geneva gear has seven steps.

A numerical example will facilitate understanding the performance of the above-described system. Assume that it is intended to produce six diagrams which overlap one another 50%. Assume further that the chart 160 is thirty inches long in the circumferential direction, that the driving drum 157 has a circumference of five inches and makes one revolution per second so that one complete chart revolution takes six seconds. With a ratio of 7:12 between gears 171 and 172, the potentiometer slider 133 makes thirty-five complete revolutions per minute or one revolution in 1.715 seconds corresponding to ⅞ of the chart length. The movement of the seven-position Geneva gear takes place during the dead angle of the potentiometer.

Under the just-mentioned conditions, and assuming that gauge 111 is connected through contacts 141 and 148 with the measuring circuit MC, the stylus 150 first traverses the diagram frame F1 (Fig. 5). Somewhere during this travel, the relay R responds to circuit balance so that a point is marked on curve C1. After the completion of this potentiometric cycle, the Geneva gear moves the gauge selector GS one step so that gauge 112 is effective to control the marking operation while the stylus moves across diagram frame F2 relative to chart 160. During this cycle period, a point is marked appertaining to the curve C2. Thereafter, the other gauges are sequentially connected to the measuring circuit until six points appertaining to the respective diagram curves C1 to C6 are recorded in the proper frames F1 to F6. Thereafter, the sequence is repeated until the entire chart area is scanned.

It will be noted that the measuring circuit and mark-producing device is inoperative during the one potentiometric cycle in which the selector contact 148 engages the vacant bank contact 147. Consequently, there is a seventh cycle in which no diagram point is recorded. As a result, the total chart area is covered by seven half frames as is apparent from Fig. 5. This has the advantage that none of the six utilized frames F1 to F6 need be cut when the chart is slit open, as it is in Fig. 3. If the cutting of a diagram frame is permissible, a seventh gauge can be connected to the same apparatus to produce seven diagram records.

Figure 7:
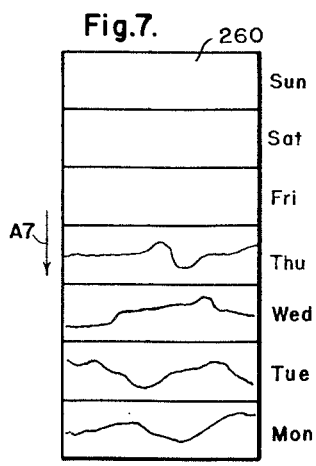

The apparatus shown in Fig. 6 serves to produce records of quantities measured during separate but comparable periods of time, and to place the respective diagram records on a common chart and in proper relation to a common time coordinate. The gauge 211, assumed to be of the variable impedance type, responds to a quantity under observation during the seven days of a week, and the recording device RD is supposed to produce seven records on sequential frames, one for each day, in a manner apparent from the developed chart 260 shown in Fig. 7 so that all diagrams have a common time base which facilitates comparing the daily records with one another. The gauge 211 forms part of a bridge circuit MC which also includes a voltage source 231, a standard impedance 234, and a potentiometer rheostat with a resistor 232 and a cyclically operable slider 233. The appertaining relay R is connected to the bridge circuit MC through the movable contact 248 of a frame selector FS and the movable contact 288 of a separately adjustable selector switch DS (day selector). The frame selector FS has seven bank contacts 241 to 247 connected with corresponding seven bank contacts of the day selector. The movable contact 288 of the day selector is placed on the proper day contact at the beginning of each day, for instance, manually or by means of a clock motor. It will be recognized that for each selected adjustment of the day selector the frame selector FS will complete the relay input circuit only when the frame selector contact 248 is in engagement with the one bank contact corresponding to the adjustment of the day selector.

The recording device RD has three stylus points 251 mounted on a conductive belt or chain 250 which passes around sprockets or rollers 259 and 253' and is driven at a slow constant speed from a suitable drive such as a synchronous clock motor or, through a reduction gear, from the same motor M that operates the shaft 268 of the recorder drum 257. The three stylus points are electrically connected with one another and only one of them passes along the chart 260 at a time in the direction of the arrow A6. Consequently, the three stylus points 251 represent, in effect, a single stylus which moves across the chart within twenty-four hours or, for instance, within ten hours if the recording period extends over only ten hours per day. The drum shaft 268 is connected with the shaft 273 of a potentiometer contact 233 through gears 271 and 272. Shaft 273 also carries the driver 274 for a Geneva wheel 275 with seven rest positions. The shaft 276 of the Geneva wheel operates the contact 248 of the frame selector FS.

Assuming that the peripheral length of the chart 260 is 30 inches and that the drum shaft 266 revolves at 24 R. P. M., the transmission ratio of gears 271 and 272 is 6:7 to make the potentiometer slider 233 revolve at 28 R. P. M. The frame selector contact 248 then revolves at 4 R. P. M. Under these conditions, one complete revolution of the endless chart takes 15 seconds. Consequently, the stylus point travels relative to chart 260 in the frame sequence direction A7 so that it traverses each individual frame within 2½ seconds. The frame selector FS completes one cycle of operation in 15 seconds and remains on each of its seven bank contacts during the just-mentioned 2½ seconds interval.

Assuming that the day selector DS is set on the Wednesday contact as illustrated, the circuit for relay R is completed only during that interval in which the frame selector contact 248 is in engagement with the bank contact 244, also as illustrated. Then, the one stylus point 251 contacting the chart 260 will produce a diagram point in the corresponding Wednesday frame of the chart. When the frame selector contact 248 moves the next step, relay R is disconnected so that no record points are marked on the chart. Consequently, a recording performance takes place only during that 1/7 of the cycle of chart revolution in which one of the stylus points scans across the one diagram frame corresponding to the selected day.

Due to the fact that there is no recording performance during a large portion of the relative stylus and chart travel, it is not necessary to provide a dead interval between the end of a potentiometric cycle and the beginning of the next cycle. In other words, the gap between the terminals of the potentiometer resistor 232 can be reduced as closely as possible to zero and the switching of the Geneva gear may take place in the unused interval of chart rotation. As a result, the individual diagrams do not require an unused spacing between one another.

This feature, of course, is not limited to multiple time base recorders as described above but is generally applicable to endless chart recorders. For instance, if the chart has an uneven number of successive diagram frames and if the recording operation is controlled to jump from one frame to the second next frame, the switching of the stepping switch may occur in the intermediate interval of cyclic chart travel and the diagram frames will then appear on the chart without intermediate spacing.

While, for the sake of simplicity, I have shown only one gauge in the embodiment of Fig. 6, it is obvious that the apparatus can be equipped with two or more gauges and either with a corresponding number of measuring circuits and potentiometers or with a gauge selector switch of the type explained in the foregoing in conjunction with Fig. 1.

It will be noted that in the embodiment of Fig. 6 the potentiometric device continues its movement during the six unused intervals. In order to reduce wear, however, it is possible to modify the apparatus so that the movable potentiometric member travels only during the one interval in which the recording performance is effective. Such a modified embodiment is illustrated in Fig. 8.

Figure 8:
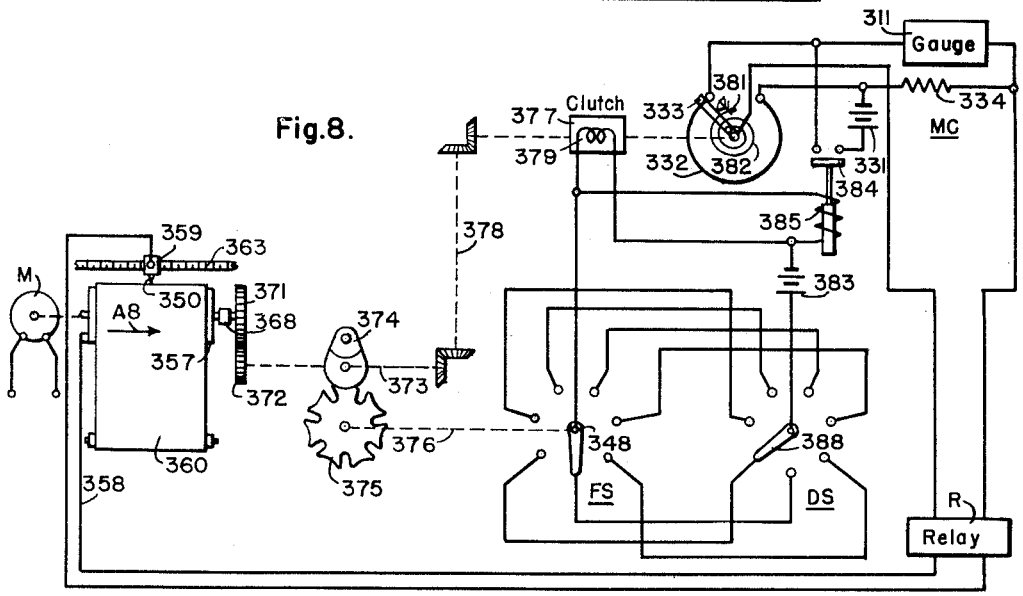
Fig. 8 represents a modification of a multiple time base recorder similar in some respects to that of Fig. 6 but equipped with a clutch-controlled, intermittently operating potentiometric device.

According to Fig. 8, a gauge 311 forms part of a bridge circuit MC with a voltage source 331, a standard impedance 334, and a potentiometric resistor 332 with a tap contact 333. The recording device RD has a stylus 350 whose carrier 359 is moved by a feed screw 363 and travels once during each day across the endless chart 360 in the direction of the arrow A8, while the drum 357 completes very many, for instance several thousand, revolutions during the same period. The shaft 368 of drum 357 has a gear 371 in meshing engagement with a gear 372 whose shaft 373 operates the driver 374 of a Geneva gear wheel 375 with seven rest positions. Gear wheel 375 drives the movable contact 348 of a frame selector FS whose bank contacts are electrically connected with those of a day selector DS substantially in the manner explained above with reference to Fig. 6.

The slider 333 of the potentiometric device is connected with the shaft 373 of the Geneva driver 374 through an electromagnetic clutch 377. For reasons of convenient illustration, a gear and shaft transmission 378 is schematically shown in Fig. 8, although it will be understood that the driving member of clutch 377 may be directly mounted on the shaft 373. The magnetic clutch 377 is active only when its magnet coil 379 is energized.

In contrast to the embodiments previously described, the potentiometer slider 333 is normally held against a stationary stop 381 under the bias of a return spring 382. When the clutch 377 is active due to energization of coil 379, the slider 333 rotates counterclockwise. When then thereafter the clutch is deenergized, the slider returns to its illustrated rest position.

The clutch control coil 379 is energized from a suitable current source 383 whose circuit extends through the selector switch contacts 348 and 388. Consequently, the clutch 377 becomes active to move the potentiometer slider 333 only during that interval of time in which the frame selector contact 348 is in a position corresponding to the day selected by the adjustment of the day selector DS. A relay 385 is connected parallel to clutch control coil 379 and has a contact 384 which closes the circuit of the voltage source 383 only during the active clutch interval. The apparatus according to Fig. 8 produces the same type of curves as that of Fig. 6.

Figure 10:
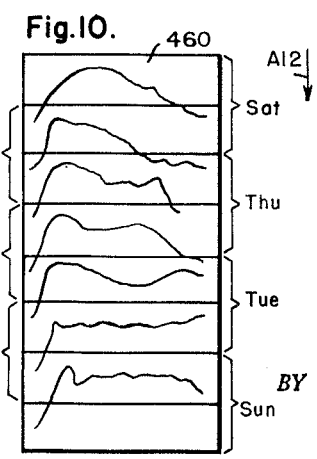
Figure 9:
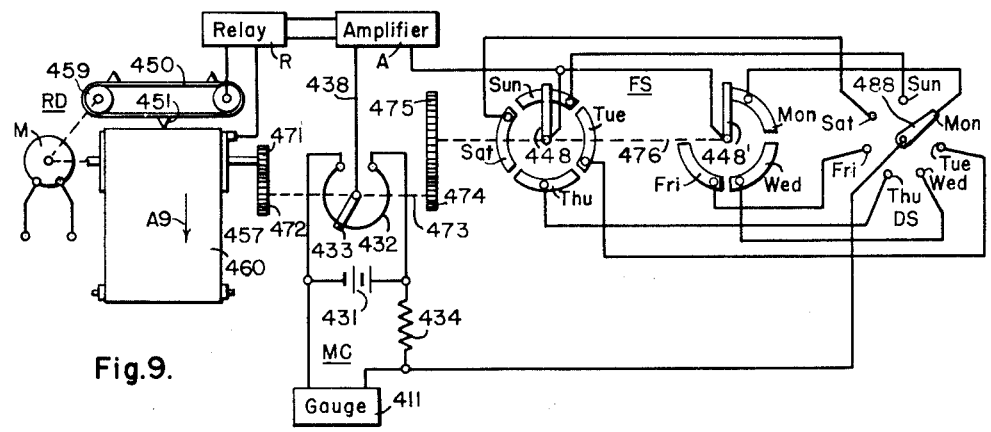
Fig. 9 illustrates diagrammatically a multiple time base recorder for producing overlapped diagrams on an endless chart such as shown in Fig. 10 in developed form.

The embodiment illustrated in Figs. 9 and 10 combines the features of overlap recording with those of multiple time base recording. According to Fig. 9, the gauge 411 is connected in a measuring bridge MC which is energized from a voltage source 431 and includes a standard impedance 434 and a potentiometer resistor 432 with a slider 433. The output circuit of the bridge is connected to an amplifier A through a frame selector FS and a day selector DS. The amplifier operates a relay R at the moment of bridge balance, in order to then energize the recording device RD. The recording device has three stylus points 451 mounted on a conductive member 450 and driven by a sprocket 459 in the same manner as explained above with reference to Fig. 6. The recorder drum 457, operated by a motor M, revolves an endless recording chart 460 in the direction of the arrow A9 as one of the stylus points 451 travels much more slowly, i. e. once within 24 hours, from the left to the right across the chart area. The shaft of drum 457 is coupled through gears 471 and 472 to the shaft 473 of the potentiometer slider 433. Shaft 473 carries a gear 474 in meshing engagement with a gear 475 on the shaft 476 of the frame selector FS. The frame selector has two banks of contact segments. One bank has four segments denoted by Sun, Tue, Thu, Sat. The other bank has only three contact segments Mon, Wed, Fri, while the fourth segment is nonconductive. The various contact segments are individually connected with the correspondingly denoted bank contacts of the day selector DS. As in the embodiments of Figs. 6 and 8, the movable contact 488 of the day selector is advanced one step at the beginning of each day, either manually or automatically, while the frame selector has two selector contact parts 448 and 448' driven by shaft 476.

Assuming again that the peripheral chart length is 30 inches and that one chart rotation is completed within 15 seconds, requiring a speed of 24 R. P. M. for drum 457, the transmission ratio of gears 471 and 472 should be such as to impart a speed of 16 R. P. M. to the shaft 473, and the transmission of gears 474 and 475 should be 1:4 in order to drive the frame selector shaft 476 at 4 R. P. M. Under these conditions, the recorded diagrams overlap 50% in accordance with the schematic and developed illustration of chart 460 in Fig. 10. This overlapping is due to the angularly overlapping arrangement of the contact segments in the frame selector FS. It will be apparent that an apparatus of the type exemplified by Fig. 9 may incorporate the various modifications, such as the arrangement of multiple gauges or multiple styli explained with reference to other embodiments in this specification.

Figure 11:
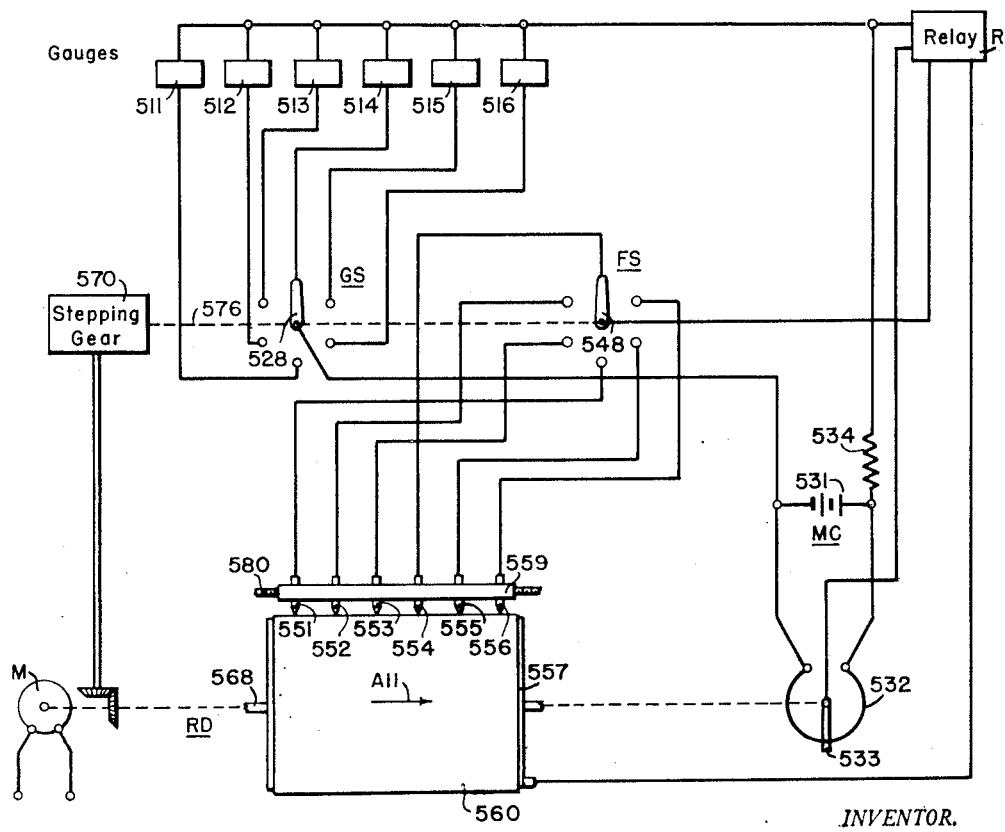
Fig. 11 is a diagrammatic illustration of another embodiment of a multiple stylus recorder designed for producing multiple diagrams on an endless strip chart, Fig. 12 being explanatory and representing a chart with overlapped diagram frames such as obtainable with a recorder of the type shown in Fig. 11.

The apparatus illustrated in Fig. 11 has a multiple stylus assembly and, in this respect, is related to the embodiment of Fig. 1. However, the apparatus of Fig. 11 is designed for producing a plurality of strip-shaped diagrams whose sequence direction extends across the direction of revolution of an endless chart.

According to Fig. 11, six gauges 511 to 516 are connected to the bank contacts of a gauge selector GS whose movable selector contact 528 is connected to a measuring circuit MC with a voltage source 531, a standard impedance 534 and a cyclically operable potentiometric device comprising a resistor 532 and a slider 533.

The recording device RD of the apparatus has an insulating stylus carrier 559 with six evenly spaced styli 551 to 556. During the operation of the apparatus, the carrier moves slowly in the direction of the arrow A11 across a chart 560 mounted around a drum 557. The shaft 568 of drum 557 is driven by a motor M. The slider 533 of the potentiometer is also connected with the shaft 568 so that the potentiometric variation is synchronous with the chart revolution.

A balance responsive relay R, appertaining to the measuring circuit MC, has its output circuit connected to the recording device RD through a frame selector FS. This selector has six bank contacts connected with the respective styli 551 to 556. The appertaining selector contact 548 connects only one of the styli at a time with relay R. The selector contacts 528 and 548 have a common shaft 570 driven by a stepping drive to advance one step for each revolution of drum 557. The stepping drive 570 is actuated from the motor M and may consist of a Geneva gear, ratchet gear, or the like mechanism.

When selector contacts 528 and 548 are in the illustrated positions, only gauge 514 and stylus 554 are effective so that the stylus 554 produces a dot mark at the moment when the measuring circuit MC passes through its balance condition. During the next revolution of drum 557, only gauge 515 and stylus 555 are effective to produce a diagram point in the next frame of the chart, and so forth.

Figure 12:
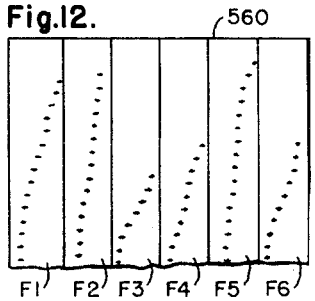

When the travel of the stylus assembly in the direction of arrow A11 is not larger than the spacing between adjacent styli, the individual diagram frames do not overlap, for instance, as shown in Fig. 12. However, in accordance with the principle explained previously, the size of the individual diagrams can be increased by having the frames overlap one another. To this end, the travel of the stylus assembly is made larger than the spacing between adjacent styli.

A recorder according to Fig. 11 may be used for obtaining special type diagrams for testing the strain or load conditions of a mechanical structure over long periods of time. For this purpose, the gauges 511 to 516 may consist of resistive strain gauges which are positioned at different points of the structure under observation in order to respond to the deformation at the respective measuring points. The following procedure may be followed: The structure is first kept unloaded while the gauges are properly balanced. Then the recording device RD is operated, for instance, for a period of one minute and then stopped. If the recorder drum 557 operates at one revolution per second, one measuring cycle is completed in six seconds. Consequently, ten zero load points are marked in each diagram frame within the first operating period of one minute. If the stylus assembly is moved along the drum in the direction of arrow A11, the ten zero marks are spaced 4 mm. After the one minute operation, the structure under test is subjected to a load or stress amounting, for instance, to ten per cent of the load maximum. Now the recorder is again operated for one minute so that ten additional dots are recorded in the respective six diagram frames. Thereafter, the load is increased 10% and the one-minute recording performance repeated, and so forth until the deformation for 100% load is recorded. The above-mentioned diagram chart shown in Fig. 12 is typical for the type of records obtained with such a method.

Figure 13:
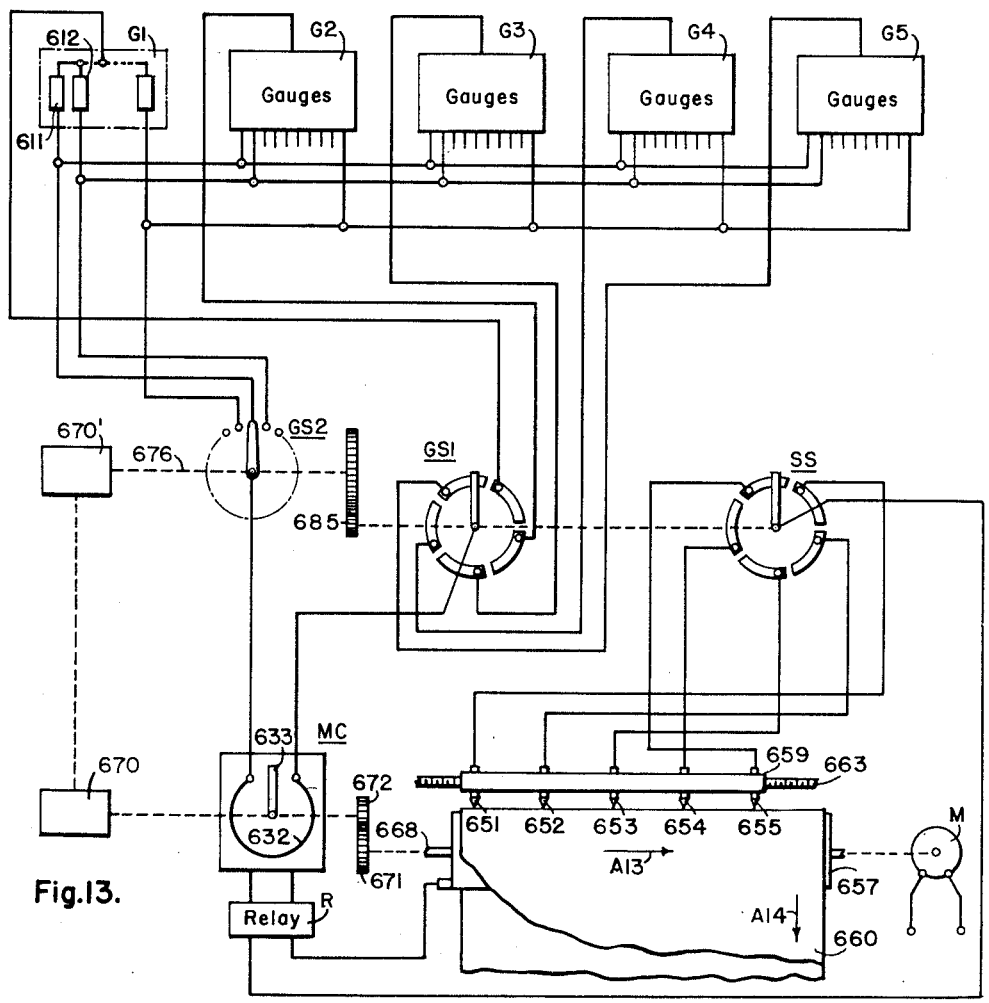
Fig. 13 shows diagrammatically another multiple-stylus recorder for very many diagrams.

The multiple-stylus recorder according to Fig. 13 is designed for producing a very large number of diagrams on an endless chart under control by a correspondingly large number of gauges. It is assumed that 120 gauges are provided and that the chart is to accommodate 120 corresponding diagrams. The gauges are arranged in five groups G1 to G5, each comprising 24 individual gauges. The gauges of each group have a common lead attached to one of the five respective bank contacts of a group selector GS1 whose movable selector contact is connected with the measuring circuit MC. Circuit MC is shown schematically, but it is indicated that it contains a potentiometric member 633 with an appertaining movable control member or slider 632. The respective other leads of the 24 gauges of each group are connected with the respective 24 bank contacts of a gauge selector GS2 as is illustrated for gauges 611 and 612 of group G1 and the corresponding two gauges of the other groups G2 to G5.

The recording device proper has an insulating stylus carrier 659 movable along the drum 657 in the direction of the arrow A13 and equipped with five styli 651 to 655. The styli are individually connected to five bank contacts of a stylus selector SS whose movable contact is connected in the output circuit of the impulse relay R controlled by the measuring circuit MC. The motor M for revolving the recorder drum 657 is connected through gears 671 and 672 to the potentiometric contact member 632. The shaft of gear 672 is connected with the shaft 676 of the gauge selector GS2 by transmission means 670 and 670' with a total transmission ratio of 24:1. A gear transmission 685 connects shaft 676 with the common shaft of the selector switches GS1 and SS and has a transmission ratio of 5:1.

Figure 15:
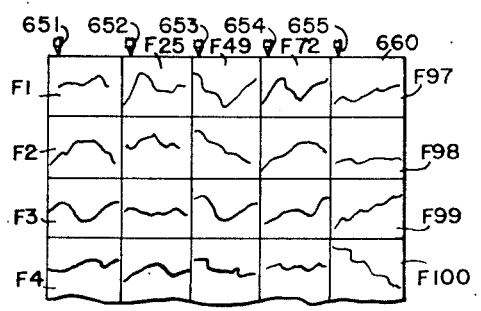
Figure 14:
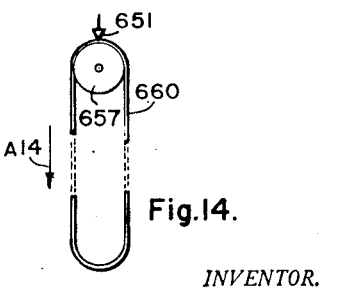
Fig. 14 is a schematic side view of the appertaining chart and chart-marking means, and Fig. 15 exemplifies a section of the chart.

Each stylus produces on the endless chart 660 a peripheral sequence of 24 diagrams. The operation is such that first one dot is marked in each of the 24 sequential diagrams of the first row, then a sequence of 24 diagram points in the second row, and so forth until a total of 120 points, one for each gauge, is recorded in the respective 120 diagram frames. Then the cycle is repeated until all diagrams are completed in an arrangement corresponding, for instance, to that partially shown in Fig. 15.

If the peripheral chart length is 750 mm. (30 inches) and the chart width is 250 mm. (10 inches), each frame is 32 mm. high (for the temperature range) and 55 mm. long (for a recording period of 24 hours). One chart revolution is completed in 30 seconds, 120 individual measurements are recorded in 150 seconds (2.5 minutes), and each of the individual curve diagrams, when completed, is composed of 576 points over the time base of 50 mm. length. The stylus movement is 2 mm. per hour, and 24 points are recorded for each diagram within one hour. The just-mentioned height or length or both dimensions of the individual diagrams can be increased by having the diagrams overlap one another in accordance with the principle and means explained previously in this specification. For instance, an overlapping of adjacent diagram frames in the direction of arrow A13 is obtained if the travel of the stylus assembly is larger than the mutual spacing of adjacent stylus members; and an overlapping in the peripheral direction of arrow A14 is obtained either by the means explained above with reference to Fig. 4 or by providing the recorder with a plurality of styli peripherally spaced from each other along the chart as explained above with reference to Figs. 1 to 3.

Relative to the above-mentioned operating speed of recording apparatus according to Fig. 13, it will be understood that all numerical values are presented only as an example and may be modified according to particular circumstances; and it should also be understood that not only in apparatus according to Fig. 13 but also in the other described embodiments and, generally, in recorders according to the invention, the recording speed can be increased by doubling or multiplying the number of channels that control the marking operation. This will be explained with reference to the embodiment of Fig. 13.

The apparatus of Fig. 13, as shown, has only one channel for sequentially controlling all five styli. If, instead, each of the five gauge groups is connected to the appertaining one stylus through its own channel (measuring circuit and relay) whose relay is then permanently connected to the one stylus, the operating speed is increased five times. An increase in speed is also obtained by providing one of more additional groups of styli and spacing these groups along the chart periphery in the manner shown in Fig. 2 while giving each group its own control channel. For instance, if a recorder otherwise corresponding to Fig. 13, has six groups of styli mutually spaced along the chart periphery as shown in Fig. 2 (the chart may be mounted on a cylinder, if desired), a six-fold increase in speed can be obtained. The theoretical speed maximum, of course, would be obtained with one stylus and channel per diagram frame.

While various embodiments and modifications are described in the foregoing, it will be understood by those skilled in the art that the invention permits of many other changes in apparatus design, circuit components and other details without departure from the essential features of the invention and within the scope of the claims annexed thereto.

I claim:

1. A multiple diagram recording apparatus of the scanning type, comprising a measuring circuit having gauge means responsive to a physical quantity, a cyclically operable circuit member for varying a circuit condition, and relay means responsive to a given value of said condition occurring at a cycle moment dependent upon said quantity; a recording device having a drum accommodating on its peripheral surface an endless chart and having a stylus assembly with a plurality of mutually insulated styli rigidly interconnected and angularly spaced from each other about said drum, said drum and said assembly being capable of revolving and translating scanning movement relative to each other; selector switch means having bank contacts connected with said respective styli and having a selector contact for sequentially connecting said styli, one at a time, with said relay means; and drive means connected with said circuit member and said device and said switch means for operating them in a fixed time relation to each other for causing said styli to produce respective diagram points in a repetitive sequence.

2. A multiple diagram recording apparatus of the scanning type, comprising a measuring circuit having gauge means responsive to a physical quantity, a cyclically operable circuit member for varying a circuit condition, and relay means responsive to a given value of said condition occurring at a cycle moment dependent upon said quantity; a recording device having a stylus assembly and having an endless chart cyclically movable in the peripheral chart direction and accommodating a plurality of sequential chart diagrams along said direction, said stylus assembly being movable transversely to said direction and having a plurality of mutually insulated styli spaced from one another in said direction; selector switch means having bank contacts connected with said respective styli and having a selector contact for sequentially connecting said styli, one at a time, with said relay means; drive means connected with said device for repeatedly imparting fast movement in said sequence direction and progressively imparting slow movement in said other coordinate direction, the extent of said fast movement being larger than the spacing between adjacent styli, and drive means connected with said selector switch means and with said circuit member and having a fixed time relation to said device so as to cause said styli to produce overlapped diagrams.

3. A multiple diagram recording apparatus of the scanning type, comprising a recording device having a cyclically revolving endless recording chart for a given number of sequential diagram frames and electro-responsive marking means progressively movable transversely of the direction of chart revolution at a slow rate compared with the cycle of chart revolution; condition-responsive electric circuit means connected with said device for controlling the marking operation of said marking means and having a cyclically operable potentiometric member, and potentiometer drive means connected with said member and having at said member a cycle period which is an integral multiple of the period of chart revolution divided by said number of diagram frames.

4. A multiple diagram recording apparatus of the scanning type, comprising a recording device having a cyclically revolving endless recording chart with a given number of peripherally sequential diagram frames and electro-responsive stylus means progressively movable transversely of the direction of chart revolution at a slow rate compared with the cycle of chart revolution; condition-responsive electric circuit means having a cyclically operable potentiometric member, a plurality of gauges, and selector switch means having bank contacts connected with said gauges and having a movable selector contact for sequentially connecting said gauges with said stylus means during respective sequential cycle periods of said potentiometric member, drive means connected with said member and said selector contact and having a fixed time relation to the period of chart revolution, said revolution period being an aliquot part of the cycle period of said potentiometric member times said number of diagram frames.

5. A multiple diagram recording apparatus of the scanning type, comprising a measuring circuit having gauge means responsive to a physical quantity, a cyclically operable circuit member for varying a circuit condition, and relay means responsive to a given value of said condition occurring at a cycle moment dependent upon said quantity; a recording device having chart means with an endless recording chart and having electro-responsive stylus means connected with said relay means to be controlled thereby, said chart means and stylus means being capable of relative movement in two coordinate directions peripheral and transverse respectively to the chart; drive means connected with said device for imparting cyclical fast movement in said peripheral direction and progressive slow movement in said transverse direction, said drive means being also connected with said circuit member to operate it at a cycle period shorter than the cycle period of said peripheral movement and corresponding to a desired number of peripherally sequential diagram frames on the chart; and selector switch means operatively connected with said circuit and comprising a selectively adjustable contact member and a movable selector contact connected with said drive means to permit said relay to control said stylus means to record a diagram in one of said chart frames selected by the adjustment of said contact member.

6. A multiple diagram recording apparatus, comprising a device having chart means for an endless recording chart for a number of peripherally sequential diagram frames and stylus means for marking respective diagrams in said frames, said chart means and stylus means being capable of relative movement in peripheral and transverse scanning directions relative to the chart, and drive means connected with said device for producing said relative scanning movement; condition-responsive electric circuit means connected with said device for controlling the marking operation of said stylus means; and stepping switch means having a selectively adjustable contact member and a cyclically movable contact member, said movable contact member being connected with said drive means to advance one step for each of said diagram frames, said switch means being operatively connected with said circuit means to permit said stylus means to mark a diagram in one of said frames dependent upon the selected adjustment of said contact member.

7. A multiple diagram recording apparatus, comprising a device having chart means for an endless recording chart for a number of peripherally sequential diagram frames and stylus means for marking respective diagrams in said frames, said chart means and stylus means being capable of relative movement in peripheral and transverse scanning directions relative to the chart, and drive means connected with said device for producing said relative scanning movement; condition-responsive electric circuit means connected with said device for controlling the marking operation of said stylus means; a driven step switch mechanically connected with said drive means to advance one step for each of said diagram frames and having a number of sequence contacts corresponding to said number of frames and a first selector contact sequentially engageable with said sequence contacts of said step switch and having a second selector contact adjustable independently of said first selector contact; and an electric circuit extending through said two selector contacts and operatively associated with said circuit means to control said circuit means to cause said stylus means to mark a diagram only when said first selector contact engages the one of the appertaining sequence contacts then electrically connected with said second selector contact.

8. A multiple diagram recording apparatus, comprising a device having chart means for an endless recording chart for a number of peripherally sequential diagram frames and stylus means for marking respective diagrams in said frames, said chart means and stylus means being capable of relative movement in peripheral and transverse scanning directions relative to the chart, and drive means connected with said device for producing said relative scanning movement; condition responsive electric circuit means having a cyclically operable potentiometric member and relay means responsive to a given circuit condition occurring during the cycle period of said member at a moment dependent upon the condition responded to, said potentiometric member being connected with said drive means so that said cycle period substantially coincides with the period in which said relative movement in said peripheral scanning direction extends through one of said respective frames, and said relay being electrically connected with said stylus means for controlling it to mark a diagram point at said moment; a driven step switch connected with said drive means to advance one step for each of said diagram frames and having a number of sequence contacts corresponding to said number of frames and a first selector contact sequentially engageable with said sequence contacts; a selector switch having sequence contacts connected with said respective sequence contacts of said step switch and having a second selector contact adjustable independently of said first selector contact; and an electric circuit extending through said two selector contacts and operatively associated with said circuit means to permit said stylus means to mark said diagram point only in one of said diagram frames dependent upon the selected adjustment of said second selector contact.

9. In recording apparatus according to claim 8, said circuits of said selector contacts being series-connected between said relay means and said stylus means so that an effective connection between relay means and stylus means exists only when the position of said first selector contact matches that of said second selector contact.

10. Recording apparatus according to claim 8 comprising an electrically controllable coupling means disposed between said potentiometric member and said drive means, said coupling means being connected with said circuit of said two selector contacts for controlling said coupling to operate said potentiometric member only when the position of said first selector contact matches that of said second selector contact.

11. In a recording apparatus according to claim 5, said cyclically operable circuit member having a cycle period longer by a given amount than the period in which said relative scanning movement in said peripheral direction covers $1/n$ of the chart periphery where $n$ is said number of diagram frames.

12. In a recording apparatus according to claim 7, said driven step switch having two groups of sequence contacts and said first selector contact having two electrically interconnected parts engageable with said respective groups, said two groups of sequence contacts being displaced relative to each other in the relative contact travel direction so that said diagram frames overlap one another.

13. A multiple diagram recording apparatus of the scanning type, comprising a measuring circuit having gauge means responsive to a physical quantity, a cyclically operable circuit member for varying the magnitude of a circuit condition, and relay means responsive to a given magnitude of said condition occurring at a cycle moment dependent upon said quantity; a recording device having a rotatable drum and having when in operation an endless chart with a given plurality of $n$ sequential diagram frames, said chart being in peripheral engagement with said drum and having a longer periphery than said drum to rotate once for a given number of drum rotations, and said device having marking means periodically movable across the chart so that said chart and said marking means are capable of scanning movement relative to each other in two coordinate directions of which one is coincident with the sequence direction of said $n$ frames; said device being electrically connected to said relay means for having said marking means produce marks during said scanning movement due to response of said relay means; drive means connected with said circuit member and with said device for operating both in a fixed time relation to each other; said circuit member having a cycle period of magnitude variation longer by a given amount than the period needed for said scanning movement to cover $1/n$ of the chart dimension in said sequence direction so that said frames overlap each other in said sequence direction.

14. A multiple diagram recording apparatus of the scanning type, comprising a balanceable electric circuit having condition-responsive gauge means, a cyclically operable potentiometric balancing member, and relay means responsive to circuit balance; a recording device having a rotatable drum and having when in operation an endless chart with a given plurality of $n$ sequential diagram frames, said chart being in peripheral engagement with said drum and having a longer periphery than said drum to rotate once for a given number of drum rotations, and said device having marking means periodically movable across the chart so that said chart and said marking means are capable of scanning movement relative to each other in two coordinate directions of which one is coincident with the sequence direction of said $n$ frames; drive means connected with said balancing member and with said recording device for operating both in a given time relation to each other; said balancing member having a cycle period of potentiometric variation which is an integral multiple of the period needed for said scanning movement to cover $1/n$ of the chart dimension in said sequence direction.

GEORGE KEINATH.

References Cited in the file of this patent

UNITED STATES PATENTS

| Number | Name | Date |
|---|---|---|
| 2,276,423 | Silverman | Mar. 17, 1942 |
| 2,303,472 | Johnston | Dec. 1, 1942 |
| 2,306,391 | Keinath | Dec. 29, 1942 |
| 2,387,760 | Keinath | Oct. 30, 1945 |
| 2,394,990 | Eisler et al. | Feb. 19, 1946 |
| 2,437,242 | Cole et al. | Mar. 9, 1948 |
| 2,485,730 | Giffen et al. | Oct. 25, 1949 |